(12) United States Patent
Connor et al.

(10) Patent No.: US 6,647,438 B1
(45) Date of Patent: Nov. 11, 2003

(54) DIRECT MEMORY ACCESS TRANSFER REDUCTION METHOD AND APPARATUS TO OVERLAY DATA ON TO SCATTER GATHER DESCRIPTORS FOR BUS-MASTERING I/O CONTROLLERS

(75) Inventors: Patrick L. Connor, Portland, OR (US); Robert G. McVay, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 447 days.

(21) Appl. No.: 09/663,957

(22) Filed: Sep. 19, 2000

(51) Int. Cl.$^7$ ............................................... G06F 13/28
(52) U.S. Cl. ............................ 710/22; 710/30; 710/52; 710/36; 370/400
(58) Field of Search ........................ 710/22, 30, 52, 710/36, 26, 23, 33, 24; 370/400; 709/213, 236, 212

(56) References Cited

U.S. PATENT DOCUMENTS 5,136,582 A * 8/1992 Firoozmand ............... 370/400
5,675,829 A * 10/1997 Oskouy et al. ............... 710/6
5,933,654 A * 8/1999 Galdun et al. ............. 710/23
6,298,396 B1 * 10/2001 Loyer et al. ................ 710/22
6,338,102 B1 * 1/2002 Garrett et al. .............. 710/33
6,480,489 B1 * 11/2002 Muller et al. ............. 370/389

* cited by examiner

*Primary Examiner*—Jeffrey Gaffin
*Assistant Examiner*—Niketa Patel
(74) *Attorney, Agent, or Firm*—Blakely, Sokoloff, Taylor & Zafman LLP

(57) ABSTRACT

Direct memory access (DMA) transfers to read data from memory are reduced by overlaying data into an immediate data space of a descriptor ring. The descriptor ring includes a context descriptor that points to the data overlaid into the immediate data space. This data space contains smaller blocks of data, such as header or control information for a packet/frame. The descriptor ring further includes scatter gather descriptors that point to data buffers outside of the descriptor ring. These data buffers contain larger blocks of data, such as payload data of the packet/frame. The scatter gather descriptor(s), context descriptor(s), and immediate data space(s) are arranged contiguously in the descriptor ring to allow the descriptor ring to be read in a single direct memory access (DMA) transfer or burst.

25 Claims, 3 Drawing Sheets

DIRECT MEMORY ACCESS TRANSFER REDUCTION METHOD AND APPARATUS TO OVERLAY DATA ON TO SCATTER GATHER DESCRIPTORS FOR BUS-MASTERING I/O CONTROLLERS

BACKGROUND OF THE INVENTION

1. Field of the Invention

The present invention relates generally to data transfers in systems, and in particular, relates to improving bus efficiency by reducing the number of direct memory access (DMA) transfers to read data from memory with a scatter gather descriptor-based bus-mastering controller.

2. Background Information

In computer systems, components are coupled to each other via one or more busses. A variety of components can be coupled to the bus, thereby providing intercommunication between all of the various components/devices. An example of a bus that is used for data transfer with a processor or for data transfer between a memory and another device is the peripheral component interconnect (PCI) bus.

In order to relieve a processor of the burden of controlling the movement of blocks of data inside of a computer, direct memory access (DMA) transfers are commonly used. With DMA transfers, data can be transferred from one memory location to another memory location, or from a memory location to an input/output (I/O) device (and vice versa), without having to go through the processor. Additional bus efficiency is achieved by allowing some of the devices connected to the PCI bus to be DMA masters.

When transferring data using DMA methods, scatter gather descriptors are often used. High performance I/O controllers, such as gigabit Ethernet media access control (MAC) network controllers, are typically scatter gather descriptor-based bus-mastering devices that allow a computer to communicate with a network. The scatter gather descriptors are used to provide address and control information about data buffers (or "scatter gather elements") in memory that the controller needs to read or write for I/O operations. For example, the descriptors provide information such as the memory location from where bytes of data are to be moved, the address to where the bytes should go, the number of bytes to move, etc.

To read a data buffer using DMA transfers, a driver for the controller fills in the descriptor with information, such as the data buffer's address and length, along with other control information. The controller then DMA transfers the descriptor from memory to a first-in-first-out (FIFO) buffer, for example, so that the controller can obtain the data buffer's information (e.g., identify the data buffer's memory location, length, etc.). After the controller has processed the descriptor to obtain this information, the controller can DMA transfer the contents/data in the data buffer referred to by the descriptor.

Accordingly, this scatter gather descriptor method uses at least two DMA transfers to read any data buffer (e.g., a DMA-transfer-to-data-buffer ratio of 2). Stated in another way, one overhead DMA transfer (to read the descriptor in the FIFO) is needed for each DMA transfer of data from the data buffer. Furthermore, each of these read operations can be split into multiple DMA transfers, thereby adding to the overhead. All of these overhead DMA transfers waste bus bandwidth and result in reduced performance.

BRIEF DESCRIPTION OF THE DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Embodiments of a method and apparatus to reduce DMA transfers by overlaying data on to scatter gather descriptors are described in detail herein. In the following description, numerous specific details are provided, such as the description of computer system components in FIG. 1, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
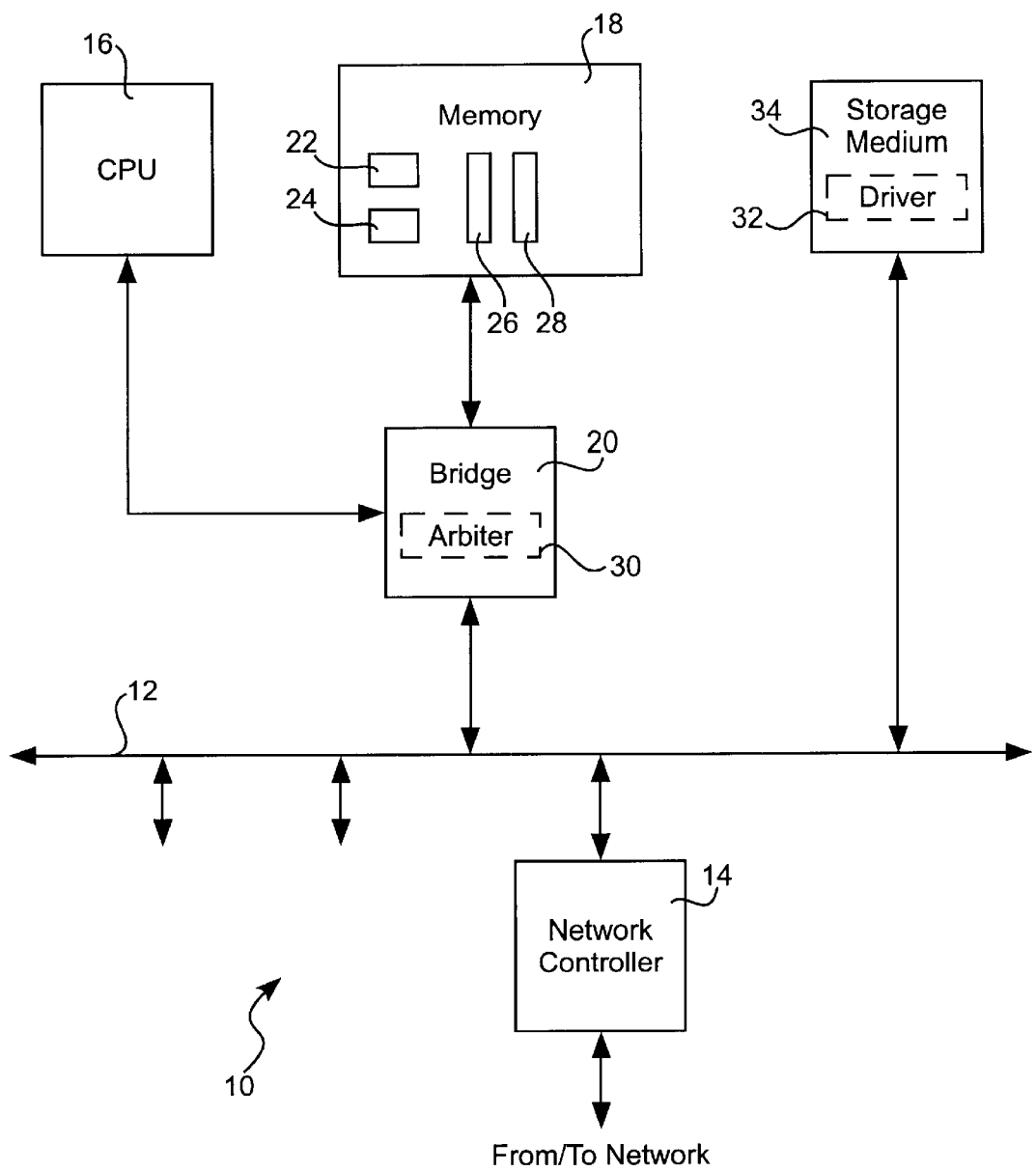
FIG. 1 is a block diagram of a system that can implement an embodiment of the invention.

Referring first to FIG. 1, shown generally at 10 is a system, such as a computer system, that can implement an embodiment of the invention. The system 10 can comprise an apparatus such as a personal computer (PC), laptop computer, wireless device, switch, router, or the like having the capability to connect to a network (not shown). The system 10 includes a bus 12, which can be a PCI bus, for example. It is to be appreciated that other types of busses, such as a universal serial bus (USB) or InfiniBand, may also be used.

Several devices may be directly or indirectly coupled to the bus 12. For instance, an I/O controller or network controller 14 is coupled to the bus 12 and allows the system 10 to send/receive network data, typically in the form of packets or frames. In one embodiment, the network controller 14 (sometimes referred to as an "adapter") can comprise an Ethernet MAC controller or network interface card (NIC), and it is understood that other types of network controllers, I/O controllers such as small computer system interface (SCSI) controllers, or cards may be used.

A processor 16, such as a central processing unit (CPU), and a storage unit or memory 18 can be coupled to the bus 12 via a bridge 20. The memory 18, sometimes referred to as "host memory" or "system memory" and typically comprising random access memory (RAM), includes a plurality of data buffers 22 and 24 and stores one or more "descriptor rings" 26, for example. According to an embodiment of the invention and as will be described in further detail below, the memory 18 can store any suitable number of descriptor rings (such as additional descriptor rings 28), with the descriptors in each descriptor ring being contiguously connected. Entire descriptor rings may or may not be contiguous with other descriptor rings in the memory 18. In another embodiment, the descriptors and data may be coalesced in a storage unit other than the memory 18, such that the descriptors and data are gathered from the memory 18, and made contiguous in a separate buffer that may or may not be within the memory 18 itself. Furthermore, although the term "ring" is used herein, it is to be appreciated that this term can include "queues" that are not in a true "ring" configuration. That is, the descriptors and data may be arranged as a contiguous sequence in a queue, without necessarily having ends that are memory-linked with each other.

To provide arbitration for use of the bus 12 (e.g., when reading from or writing to the memory 18), the bridge 20 includes an arbiter 30. A driver 32 controls operation of the network controller 14 (when the network controller 14 is made a bus master by the arbiter 30), and performs other operations related to the descriptor ring 26, as will be described in further detail below. The driver 32 is typically embodied in software that is stored in a machine-readable storage medium 34, such as a hard disk drive of the system 10, and is executed by the processor 16. As is known in the art, execution of the software of the driver 32, during normal operation, can include copying this software into the memory 18 and/or into a cache (not shown) of the processor 16, and execution of this software from that location.

Figure 2:
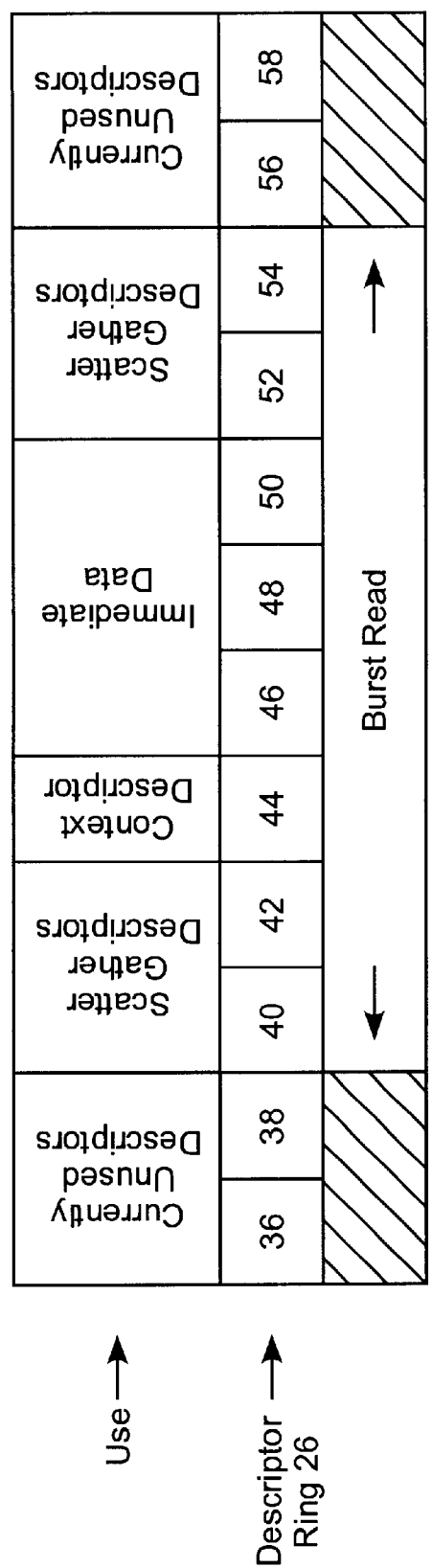
FIG. 2 depicts an arrangement of descriptors and data that can be processed by the system of FIG. 1 according to an embodiment of the invention.

An example of an arrangement of the descriptor ring 26 that can be generated by the driver 32 is shown in FIG. 2. According to an embodiment, each descriptor ring 26 can have individual descriptors (and data) 40–54 that are contiguously stored in the memory 18, thereby allowing several descriptors (and data) to be read in one DMA transfer (e.g., a single burst read). For purposes of illustration in FIG. 2, the descriptors (and data) 40–54 are shown in the descriptor ring 26 in specific quantities and locations. It is understood that the invention is not limited by the specific number of descriptors/data read in each burst, by the number of descriptors or data in each descriptor ring, or by the specific memory byte size of the descriptors or data in the descriptor rings. Also for illustrative purposes, unused descriptors 36–38 and 56–58 are shown in FIG. 2 to indicate descriptors (and/or data) in the same descriptor ring and/or in an adjacent descriptor ring that are not read when the descriptors (and data) 40–54 are burst read.

In the example of the descriptor ring 26 shown in FIG. 2, the descriptors 40–42 and 52–54 are used as scatter gather descriptors that point to a first set of data stored in data buffers (e.g., the data buffers 22 and 24) of the memory 18. The descriptor 44 is used as a control descriptor or context descriptor that indicates the presence of a second set of data that is overlaid in the descriptors' 46–50 space in the descriptor ring 26. That is, the descriptor ring 26 includes one or more immediate data spaces (e.g., the descriptors' 46–50 space) that are subsequent to the descriptor 44 and that contain data rather than conventional descriptor information. Together, the descriptors (and data) 40–54 can comprise a portion of the information (e.g., bytes) associated with a data transfer (e.g., frame).

According to an embodiment of the invention, the driver 32 arranges the descriptors 40–54 contiguously within the memory 18, in a manner known by those skilled in the art having the benefit of this disclosure. The driver 32 also performs the tasks of filling in the appropriate descriptors 40–42 and 52–54 with descriptor information, and copying frame/packet data from data buffers of the memory 18 to the descriptors' 46–50 spaces, in a manner also known by those skilled in the art having the benefit of this disclosure. In another embodiment, the driver 32 arranges/builds the descriptors 40–44 and 52–54 around a data buffer that already stores the data to be held in the descriptors'0 46–50 spaces. This embodiment provides the driver 32 with the flexibility of not having to copy this data from one memory location to another. In other words, the descriptor ring 26 is formed by the driver 32 around the relevant data buffers, thereby using these buffers as the immediate data space.

In an embodiment of the invention, the data that is overlaid in the descriptors' spaces 46–50 have a substantially smaller memory byte size than the data in data buffers that are pointed to by the descriptors 40–42 and 52–54. The data overlaid in the descriptors' spaces 46–50 can comprise header, addressing, and control information for a packet, for example. The data in the data buffers that are pointed to by the descriptors 40–42 and 52–54 can comprise the larger-sized frame payload data, for example. By using the descriptors 40–42 and 52–54 to point to larger blocks of data, rather than copying these blocks of data into the descriptor' spaces 46–50, the burden of performing large memory copies (from the data buffers 22 or 24 to the descriptor rings 26 or 28) is avoided. This results in less burden to the processor 16 and to the memory subsystem of the system 10, thereby not significantly or adversely affecting the system's 10 efficiency and latency.

With the embodiment of the descriptor ring 26 shown in FIG. 2, multiple descriptors and data can be read a single read DMA transfer operation. This significantly improves bus performance, since using the descriptor bursting method allows several descriptors to be read at once. An embodiment of the invention can also minimize or restrict the number of descriptors, such as the descriptor 44, which are accompanied by a dedicated immediate data space. In the cases where it is desirable or advantageous to have an immediate data space, this restriction is overcome by using the descriptor(s) 44 to inform the hardware of the system 10 that data follows immediately after the descriptor 44 and that the data is overlaid on the descriptors' 46–50 spaces that follow in the descriptor ring 26.

In the example shown in FIG. 2, the four scatter gather descriptors 40–42 and 52–54 are fetched by the network controller 14 (e.g., two descriptors from the beginning and two descriptors from the end), along with the descriptor 44 for the immediate data space and the data in the descriptors' 46–50 spaces. Together, this read/fetch operation comprises a single DMA transfer. Next, the network controller 14 reads the four data buffers that the four scatter gather descriptors 40–42 and 52–54 respectively point to. These data buffer read operations comprise four DMA transfers. Hence, a minimum total of five DMA transfers is used to read five data buffers. A DMA-transfer-to-data-buffer ratio of 1 is thereby achieved, which is a significant improvement over the ratio of 2 described above for the prior art.

In embodiments where data is copied from data buffers to the descriptors' 46–50 spaces by the driver 32, the driver 32 may copy only small amounts of data to the immediate data space, so that latency is not unnecessarily increased by copying large blocks of data. In one embodiment, the size of this immediate data space is not fixed, but rather, can be incrementally increased or decreased by the driver 32, based on the small unit size of the descriptors.

By providing the descriptor ring 26 with small-sized descriptors, which themselves may or may not be of a fixed size, that are stored together contiguously in the memory 18, an embodiment of the invention allows several descriptors to be fetched at once. As a result, the average number of DMA transfers per data buffer approaches 1. In effect, the system 10 improves its bus efficiency by waiting for several descriptors to be ready for a single DMA transfer. In situations where the network controller's 14 application is latency-sensitive, waiting for too many descriptors to be queued can reduce performance. Therefore, to avoid incurring too much latency, an embodiment may only fetch a relatively small number of descriptors at once. This latency may also be mitigated, without having to restrict the fetching to only a small number of descriptors, if data in the immediate data spaces is combined with and DMA transferred along with the descriptors in a manner shown in FIG. 2.

Figure 3:
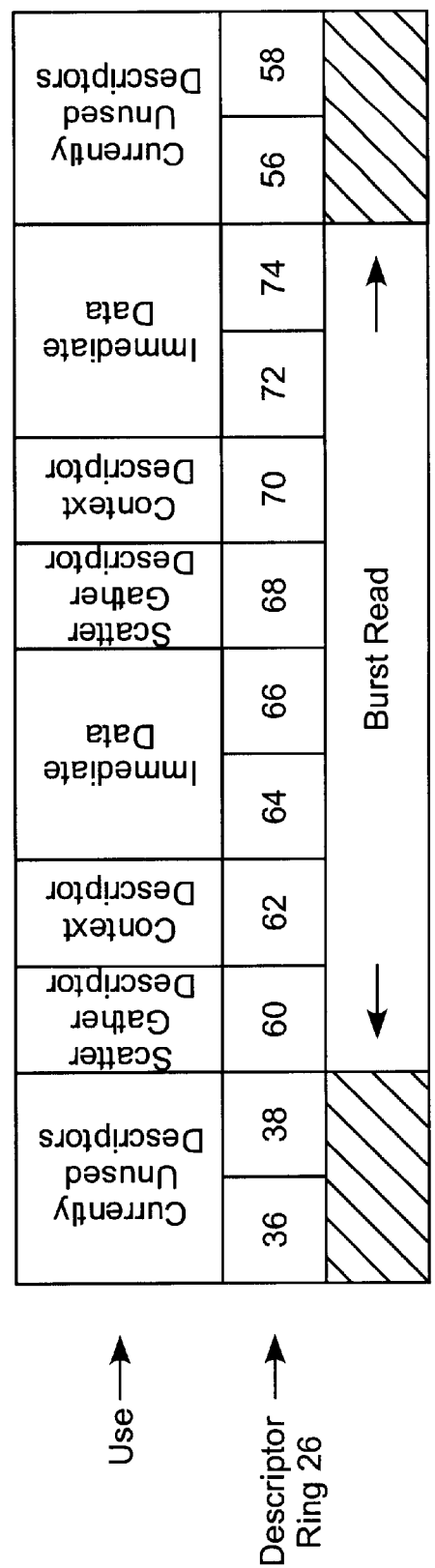
FIG. 3 depicts another arrangement of descriptors and data that can be processed by the system of FIG. 1 according to an embodiment of the invention.

FIG. 3 illustrates another example of how descriptors and data may be arranged in the descriptor ring 26. In the arrangement of FIG. 3, two scatter gather descriptors 60 and 68, two context descriptors 62 and 70, and two immediate data buffers/spaces 64–66 and 72–74 can be fetched in a single DMA transfer. Another two DMA transfers can be used to read the two data buffers pointed to by the scatter gather descriptors 60 and 68. This results in a total of three DMA transfers to read four data buffers, which is a DMA-transfer-to-data-buffer ratio of 0.75. Thus, a significant advantage in bus performance can be achieved by carefully controlling the number of descriptors and immediate data spaces in each descriptor ring 26.

DMA profiles similar to the above example in FIG. 3 can be used in Ethernet MAC applications. The typically small frame headers are coalesced into the immediate data spaces 64–66 and 72–74 by the driver 32, with the driver 32 further adding information to the scatter gather descriptors 60 and 68 so that they point to the frame payload stored in data buffers in the memory 18. If two frames worth of descriptors are fetched at once and each has one scatter gather descriptor (pointing to the payload buffer) and one immediate data space, this results in three DMA transfers for four buffers, as in the example of FIG. 3.

As evident from the above-described embodiments, overlaying the data into the descriptor ring(s) 26 provides certain advantages. For a first consideration, it is possible to have a DMA-transfer-to-data-buffer ratio lower than 1, as demonstrated by the embodiment shown in FIG. 3. Next, the low DMA-transfer-to-data-buffer ratio can be achieved without copying large buffers into the descriptor rings, since conventional descriptors can be used instead to point to the data in these large buffers. Furthermore, because the immediate data spaces are not of a fixed size in an embodiment and can be incrementally sized based on the small unit size of individual descriptors, no significant amount of data is discarded during DMA transfers. This is in contrast to existing methods, where the immediate data spaces need to be made sufficiently large, even when they may not be used to hold data. This can result in large portions of the DMA transfers being discarded if the immediate data space is not used, resulting in the waste of bus bandwidth during the read DMA transfer.

In conclusion, an embodiment of the invention overlays data into an immediate data space of a contiguous ring of descriptors, while using descriptors in the ring to point to larger blocks of data held in data buffers. This allows DMA transfer efficiency to be maximized, since more bytes can be burst read. Stated in another way, bus efficiency is improved by reducing the number of DMA transfers that need to be made to get data to the network controller 14.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, although FIGS. 2 and 3 show the context descriptors 44, 62, and 70 as being directly contiguous with the immediate data spaces, it is possible to provide other arrangements of descriptor rings where scatter gather descriptors are arranged between the context descriptors and the data spaces. In such an embodiment, the context descriptors have information that identify the location of the data spaces in the descriptor ring, thereby allowing the descriptors and data in the descriptor ring to still be read in a single burst, provided that the scatter gather descriptors, context descriptors, and data spaces are kept contiguous.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
    providing a descriptor ring having a first descriptor to identify a first subset of a data set, the first sub-set being stored in a data buffer outside of the descriptor ring;
    providing the descriptor ring with a second descriptor to identify a second subset of the data set, the second subset being overlaid in the descriptor ring;
    arranging the first and second descriptors and the second subset of data contiguously in the descriptor ring; and
    reading the contiguous arrangement of the first and second descriptors and the second subset of data using a single direct memory access (DMA) transfer.

2. The method of claim 1, wherein the first descriptor and the second descriptor comprise scatter gather descriptors.

3. The method of claim 1, wherein the data set comprises a frame of data.

4. The method of claim 3, wherein the first subset of data comprises frame payload data and wherein the second subset of data comprises frame header data.

5. The method of claim 1, wherein the second subset of data has a smaller memory size than the first subset of data.

6. The method of claim 1, further comprising copying the second set of data into the descriptor ring from the data buffer.

7. The method of 1, further comprising reading the first subset of data from the data buffer after reading the contiguous arrangement of the first and second descriptors and the second set of data.

8. The method of claim 1, further comprising:
    identifying the memory location in which the second subset of data is stored; and
    contiguously forming the first and second descriptors adjacent to the identified memory location.

9. The method of claim 1, wherein the second descriptor is directly contiguous with the overlaid second set of data.

10. The method of claim 1, wherein the first descriptor is arranged between the second descriptor and the second data subset.

11. A method comprising:
    providing a first descriptor to identify a first set of data, the first set of data comprising a first part of a data frame;

providing a second descriptor to identify a second set of data, the second set of data comprising a second part of the data frame;

contiguously arranging the first and second descriptors and the second set of data, wherein the first set of data is noncontiguous with the contiguous arrangement;

reading the contiguously arranged first and second descriptors and the second set of data in a first direct memory access (DMA) transfer; and reading the first set of data in a second DMA transfer.

12. The method of claim 11, wherein the first set of data has a larger memory size than the second set of data.

13. The method of claim 11, wherein the first and second descriptors and the second set of data are arranged in a descriptor ring and wherein the first set of data is stored in a memory location outside of the descriptor ring.

14. The method of claim 13, further comprising copying the second set of data into the descriptor ring.

15. A machine-readable medium having stored thereon data representing sequences of instructions that, when executed by a processor, cause the processor to perform operations comprising:

creating a descriptor ring having a first descriptor to identify a first set of data outside of the descriptor ring, the first set of data comprising a first portion of a data frame;

providing the descriptor ring with a second descriptor to identify a second set of data to be overlaid into a data space of the descriptor ring, the second set of data comprising a second portion of the data frame;

arranging the first and second descriptors and the data space contiguously in the descriptor ring;

reading the first and second descriptors and the second set of data in a first direct memory access (DMA) transfer; and reading the first set of data in a second DMA transfer.

16. The medium of claim 15, further comprising instructions that, when executed by the processor, cause the processor to perform operations comprising:

inserting information in the first descriptor to identify a location of the first set of data; and inserting information in the second descriptor to identify a location of a data space for the second set of data in the descriptor ring.

17. The medium of claim 15, further comprising instructions that, when executed by the processor, cause the processor to perform operations comprising:

copying the second set of data from a data buffer location to the data space in the descriptor ring.

18. An apparatus, comprising:

a storage unit comprising a plurality of data buffers;

a controller coupled to the storage unit; and a driver to generate a descriptor ring, the descriptor ring having:

a first descriptor to identify a first set of data stored in one of the plurality of data buffers, the first set of data comprising a first portion of a data frame, and a second descriptor to identify a second set of data overlaid in the descriptor ring, the second set of data comprising a second portion of the data frame;

the controller being capable of obtaining the first descriptor, the second descriptor, and the second set of data using a single direct memory access (DMA) operation.

19. The apparatus of claim 18, wherein the first set of data comprises frame payload data.

20. The apparatus of claim 18, wherein the second set of data comprises frame header data.

21. The apparatus of claim 18, wherein the driver generates the first descriptor, the second descriptor, and the second set of data contiguously in the descriptor ring.

22. A method comprising:

storing a first descriptor in a descriptor ring, the first descriptor identifying a first set of data, the first set of data being stored outside the descriptor ring, the first set of data comprising a first portion of a data frame;

storing a second descriptor in the descriptor ring, the second descriptor identifying a second set of data, the second set of data being a second portion of the data frame;

storing the second set of data in the descriptor ring; and reading the first descriptor, the second descriptor, and the second set of data using a single direct memory access (DMA) transfer.

23. The method of claim 22, wherein the first descriptor, the second descriptor, and the second set of data are stored contiguously in the descriptor circle.

24. The method of claim 22, wherein the second set of data is smaller than the first set of data.

25. The method of claim 22, wherein the second set of data is copied into the descriptor ring from a data buffer.

* * * * *

UNITED STATES PATENT AND TRADEMARK OFFICE
CERTIFICATE OF CORRECTION

PATENT NO. : 6,647,438 B1
DATED : November 11, 2003
INVENTOR(S) : Connor et al.

It is certified that error appears in the above-identified patent and that said Letters Patent is hereby corrected as shown below:

<u>Column 4,</u>
Line 3, delete "descriptors'0", insert -- descriptors' --.

Signed and Sealed this

Third Day of February, 2004

JON W. DUDAS
*Acting Director of the United States Patent and Trademark Office*